US006711686B1

United States Patent
Barrett

(10) Patent No.: US 6,711,686 B1
(45) Date of Patent: Mar. 23, 2004

(54) SECURITY MANAGEMENT TOOL FOR MANAGING SECURITY ATTRIBUTES IN COMPUTER SYSTEMS

(75) Inventor: John Barrett, Austin, TX (US)

(73) Assignee: Dell USA L.P., Round Rock, TX (US)

(*) Notice: Subject to any disclaimer, the term of this patent is extended or adjusted under 35 U.S.C. 154(b) by 0 days.

(21) Appl. No.: 09/342,695

(22) Filed: Jun. 29, 1999

(51) Int. Cl.$^7$ .................. G06F 11/30; G06F 12/14; H04L 9/00

(52) U.S. Cl. .................. 713/200; 713/164; 713/184; 713/1; 713/2; 713/201

(58) Field of Search ...................... 713/1, 2, 201, 713/184, 164

(56) References Cited

U.S. PATENT DOCUMENTS

| | | | | |
|---|---|---|---|---|
| 4,794,389 A | * | 12/1988 | Luck et al. | |
| 5,184,267 A | * | 2/1993 | Mallary | |
| 5,402,492 A | * | 3/1995 | Goodman et al. | 713/202 |
| 5,471,617 A | * | 11/1995 | Farrand et al. | |
| 5,483,596 A | * | 1/1996 | Rosenow et al. | |
| 5,604,904 A | * | 2/1997 | Kini | |
| 5,619,657 A | * | 4/1997 | Sudama et al. | |
| 5,689,416 A | * | 11/1997 | Shimizu et al. | 364/185 |
| 5,724,426 A | * | 3/1998 | Rosenow et al. | |
| 5,764,890 A | * | 6/1998 | Glasser et al. | |
| 5,790,548 A | * | 8/1998 | Sistanizadeh et al. | |
| 5,793,982 A | * | 8/1998 | Shrader et al. | 395/200.62 |
| 5,838,918 A | * | 11/1998 | Prager et al. | |
| 5,841,972 A | * | 11/1998 | Fanisher | 395/200.1 |
| 5,850,516 A | * | 12/1998 | Schneier | |
| 5,850,559 A | * | 12/1998 | Angelo et al. | |
| 6,223,284 B1 | * | 4/2001 | Novoa et al. | 713/100 |
| 6,292,900 B1 | * | 9/2001 | Ngp et al. | 713/200 |
| 6,321,259 B1 | * | 11/2001 | Ouellette et al. | 709/220 |
| 6,366,912 B1 | * | 4/2002 | Wallent et al. | 707/9 |

FOREIGN PATENT DOCUMENTS

EP 0547741 A1 * 12/1991 ........... G06F/12/14

* cited by examiner

Primary Examiner—Gilberto Barrón
Assistant Examiner—Grigory Gurshman
(74) Attorney, Agent, or Firm—Haynes and Boone, LLP

(57) ABSTRACT

A Security Management Tool (SMT) is defined and created that solves the problem of efficiently and accurately configuring security attributes for multiple computer systems. SMT executes an automated operation that captures a definition of security attributes on a particular, selected computer system and sets the captured security attribute definition on one or more subsequently-configured systems. In various embodiments, SMT clones security attribute information according to selected security information groupings. Typical security information groupings include User/Group security information, file system security information, registry system security information groupings, and the like. SMT stores security information in a security attribute file that serves as a central security configuration database. SMT accesses the central security configuration database to recreate the setting of security attributes on other computer systems.

24 Claims, 5 Drawing Sheets

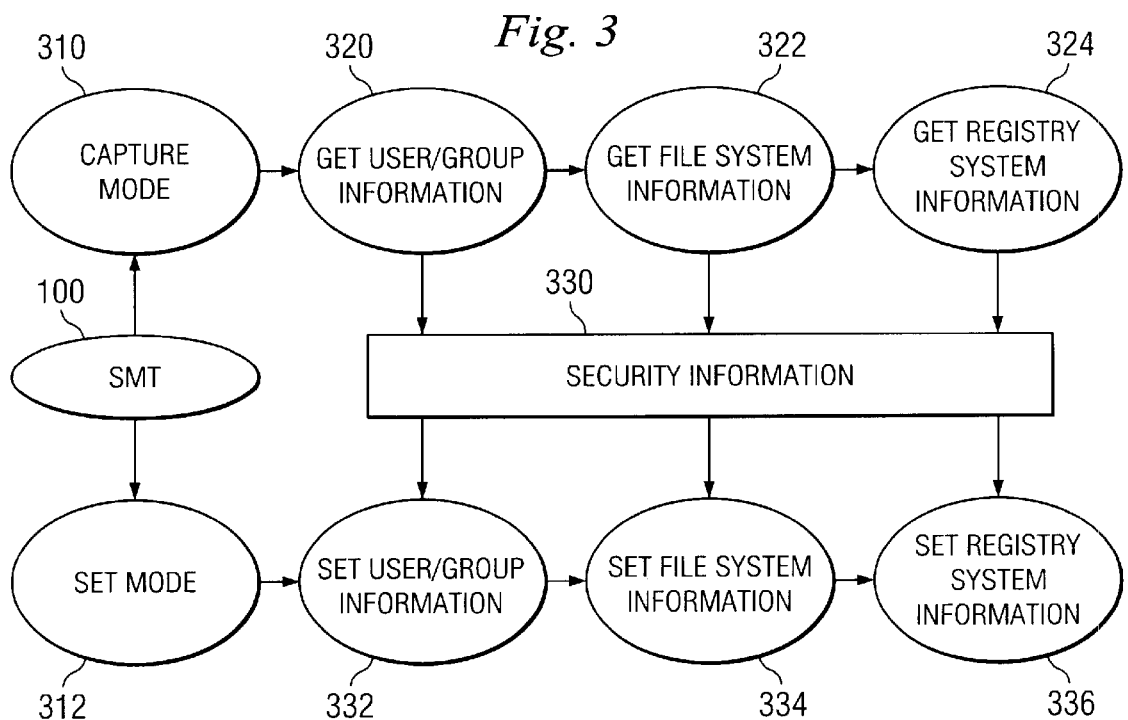
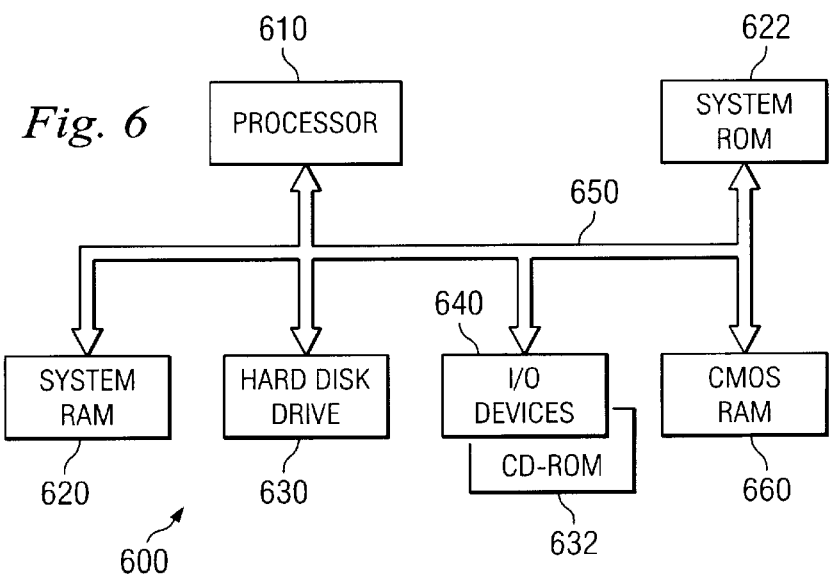

SECURITY MANAGEMENT TOOL FOR MANAGING SECURITY ATTRIBUTES IN COMPUTER SYSTEMS

BACKGROUND

A computer system is typically purchased and supplied as a combined hardware-software system. Many computer system suppliers use high-capacity compact disk (CD) ROMs for supplying software images. The computer system suppliers that supply software on CD ROMs only sell a limited number of hardware configurations (for example 4 to 8) that utilize even fewer software configurations (for example 2 or 3). The software system includes a common operating system, hardware drivers, software utilities, and application programs for usage among all computer systems of a particular configuration. These computer system suppliers have the software diskettes pressed en masse, generally in batches in the ten thousand to the hundred thousands range, so that identical software systems are supplied interchangeably to many computer systems.

The conventional hardware computer system typically includes various different hardware subsystems. During installation of these conventional mass-produced software systems to hardware computer systems, some software configuration is generally performed. The downloading process often includes routines that automatically detect an identification of the hardware subsystems and build appropriate drivers for the detected subsystems.

Many different hardware vendors supply the hardware subsystems and often many different software suppliers supply software modules supplied on the mass-produced diskettes. A common problem with the conventional technique for supplying software to a computer system using mass-produced software is that various inconsistencies often arise among the various hardware subsystems and the software modules. The first time a particular hardware-software system configuration is combined is when a customer attempts to bring up the system, long after the system has left the factory. A customer typically does not have the expertise to correctly set up various configurable characteristics of the hardware and software to optimally execute the software on a particular hardware configuration. Therefore, bringing up a system is often a painful and time-consuming exercise for the both the computer system customer and the vendor with the customer making frequent usage of the vendor's customer help services.

Security configuration is another aspect of defining and setting the system configuration in business and personal computing. Companies and individuals invest greatly, both in money and time, in the purchase of executable software and the development of information contained in databases, textual documents, spreadsheets, and the like. The protection of information resources in an important concern.

Businesses and personal computer users demand the incorporation of security and integrity features into computers to protect access to critical files and to guarantee the trustworthiness of installed programs. An ideal implementation of security features interferes with normal computer operation only minimally.

Two causes of security breaches in computer systems are file corruption and viruses. File corruption occurs in an event such as a system failure that occurs during a file transfer. File corruption is thus largely avoided by controlling the power-down sequence of the computer system, particularly in computers with advanced operating systems such as Windows 95™ and Windows NT™. Operating systems control power-down by requiring the user to shut down using specified steps rather than by simply turning off the power switch. Restriction of the power-down sequence allows various status information and configuration data contained in a Windows Registry file to update only when the system is properly shut down. Data stored in a disk cache is flushed to the disk only when the user properly exits Windows 95™ or Windows NT™.

Network connections that are not properly terminated violate system security. For example, termination of power that violates the shutdown procedure can corrupt the Windows Registry file and compromise reliability of the computer during subsequent operations. It should be noted, however, that properly exiting these operating systems requires the user to take affirmative action via menu commands prior to toggling the on/off power switch.

Computer viruses are the second threat to software integrity and can be hostile, clandestine and created to target specific types of software or hardware. Viruses are introduced into a computer in any way the computer communicates externally including a floppy drive, a network connection, a modem connection, or the like. Viruses self-replicate, generating multiple copies and secretly attaching copies to files or boot records so that the user is unaware of the intrusion. Once a virus has attached to a host program, integrity of the host is violated. Once infected, any subsequent copies of the host file also contain the virus, thereby increasing the potential for destruction. The virus is then activated when the file is executed. Consequently, a virus attached to a data file may remain dormant because the data file is not executable.

A further aspect of system configuration in computer systems is the security configuration of a particular computer system within a network. One trend in computing is the development of client/server architectures in distributed computing environments to support transaction processing applications. Present-day distributed computing environments often include interconnected mainframes, minicomputers, servers and workstations. Integration of mainframes, minicomputers, servers and workstations into a distributive computing environment creates the need for system management tools sufficient for reliable operation.

Computer purchasers who deal with Dell Computer, Inc. frequently order computer systems configured with one or more software customizations. Some customizations include loading of specific application software and setting of specific software attributes. No automated procedure exists for setting software attributes. In particular, no automated procedure exists for setting system security attributes so that security attributes are either not set or are set using tedious and error-prone manual techniques.

Current manual techniques for setting security attributes in computer systems operating in a Windows NT™ environment, for example, include checking of security settings on a system using tools supplied by the Windows NT™ operating system. Tools include User Manager, Windows NT Explorer™, and a Microsoft™ Registry Editor. A user typically employs the tools to check security settings on one computer and then, using the same tool set, recreates the security settings on another computer. Microsoft™ supplies additional tools as part of a Windows NT™ resource kit and a Zero Administration Kit (ZAK) that partially automates configuration tasks.

What is needed is a configuration utility that efficiently and accurately configures security attributes for a large number of computer systems with variable security requirements. Existing general purpose utilities such as the Microsoft™ Registry Editor are error prone and do not have the ability to configure multiple computers simultaneously.

SUMMARY

A Security Management Tool (SMT) is defined and created that solves the problem of efficiently and accurately configuring security attributes for multiple computer systems. To this end, a method of configuring security attributes in a computer system includes reaching a file in a storage medium, the file storing a plurality of security attributes acquired from a previously-configured computer system; and setting a security setting of the computer system, the security setting corresponding to a security attribute read from the file.

BRIEF DESCRIPTION OF THE DRAWINGS

The features of the described embodiments believed to be novel are specifically set forth in the appended claims. However, embodiments of the disclosure relating to both structure and method of operation, may best be understood by referring to the following description and accompanying drawings.

FIG. 3 is a schematic block diagram that illustrates modes of operation of a Security Management Tool (SMT) that is used to configure security attributes in a computer system.

FIG. 6 is a block diagram showing computer system hardware that is suitably configured using the Security Management Tool.

DETAILED DESCRIPTION

Figure 1:
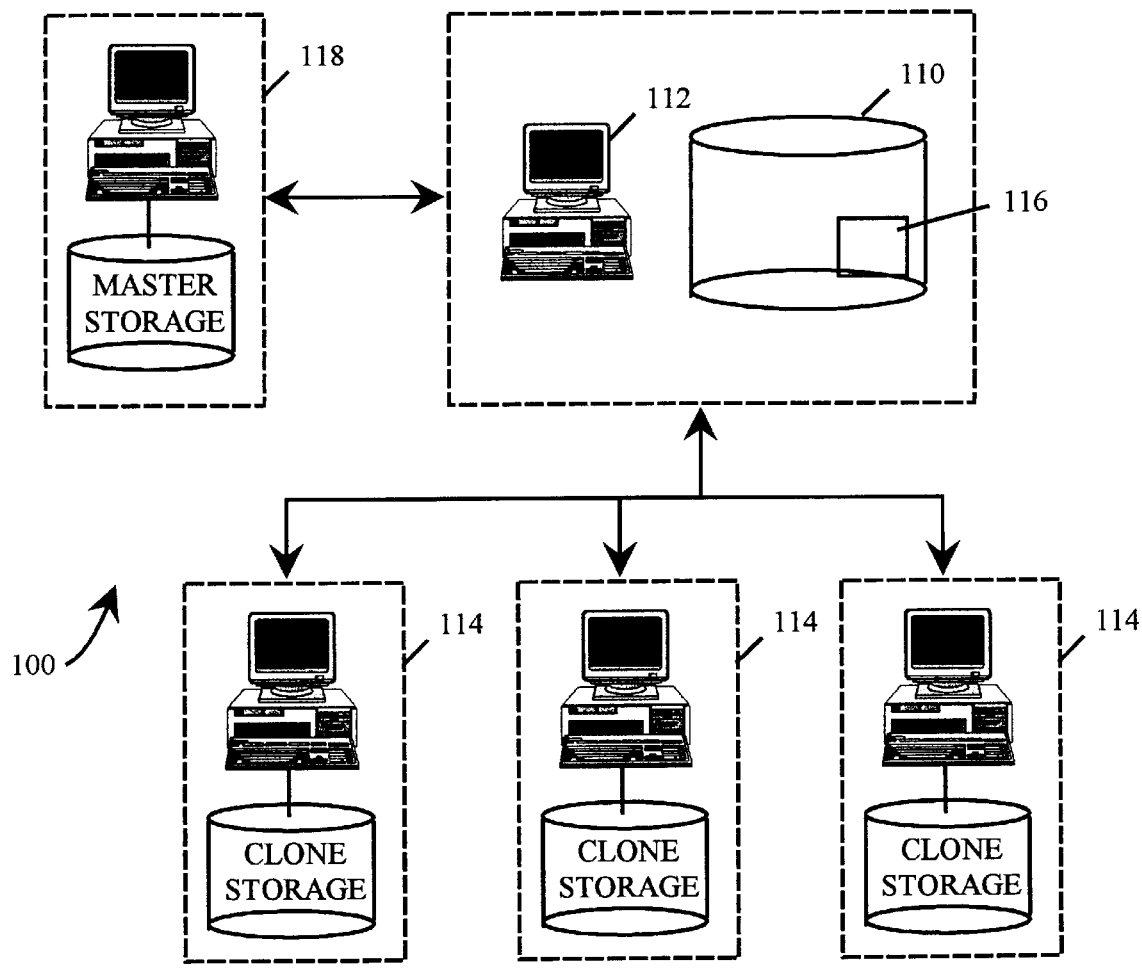
FIG. 1 is a schematic block diagram showing a high-level logical structure of a network within which an embodiment of a Security Management Tool (SMT) is implemented.

Referring to FIG. 1, a schematic block diagram shows a high-level logical structure of a network within which an embodiment of a Security Management Tool (SMT) 100 is implemented. A central security configuration database 110 stores security attribute information 116 in a security management system 112. The SMT 100 controls generation of and access to security attribute information 116 that is stored within the central security configuration database 110. The security attribute information 116 contains various types of security information which may be used by selected devices of a plurality of devices 114 in a distributed computing and networking system. In some embodiments, the devices 114 are computers or computing systems that are connected to the security management system 112.

The security attribute information 116 includes information that is used to configure a device 114 for a specified security functionality. The plurality of devices 114 generally includes devices that are dynamically connected to and disconnected from the security management system 112 network for the purpose of capturing and setting security attributes on the devices 114. A "model" or "master" device 118 has a known security attribute configuration that is stored in the central security configuration database 110 during a "capture" operation. Generally, a plurality of security attribute configurations, captured from a plurality of master devices 118, are stored in the central security configuration database 110. A particular security attribute configuration is selected from the central security configuration database 110 using the SMT 100 and set in a particular selected device 114.

Any number or combination of devices 114 and master devices 118 may be connected to the security management system 112 at one time. For example, a single master device 118 and no devices 114 may be connected to the security management system 112 during capture of the security attribute configuration for the connected master device 118. Subsequently either single devices 114 may be connected to the security management system 112 or multiple devices 114 may be connected in combination during setting of the configuration in the devices 114. The master device 118 may be connected or disconnected from the security management system 112 during setting of the security attribute configurations of the devices 114. In other examples, a plurality of master devices 118 may be connected to the security management system 112 while any number of devices 114 are connected.

Figure 2:
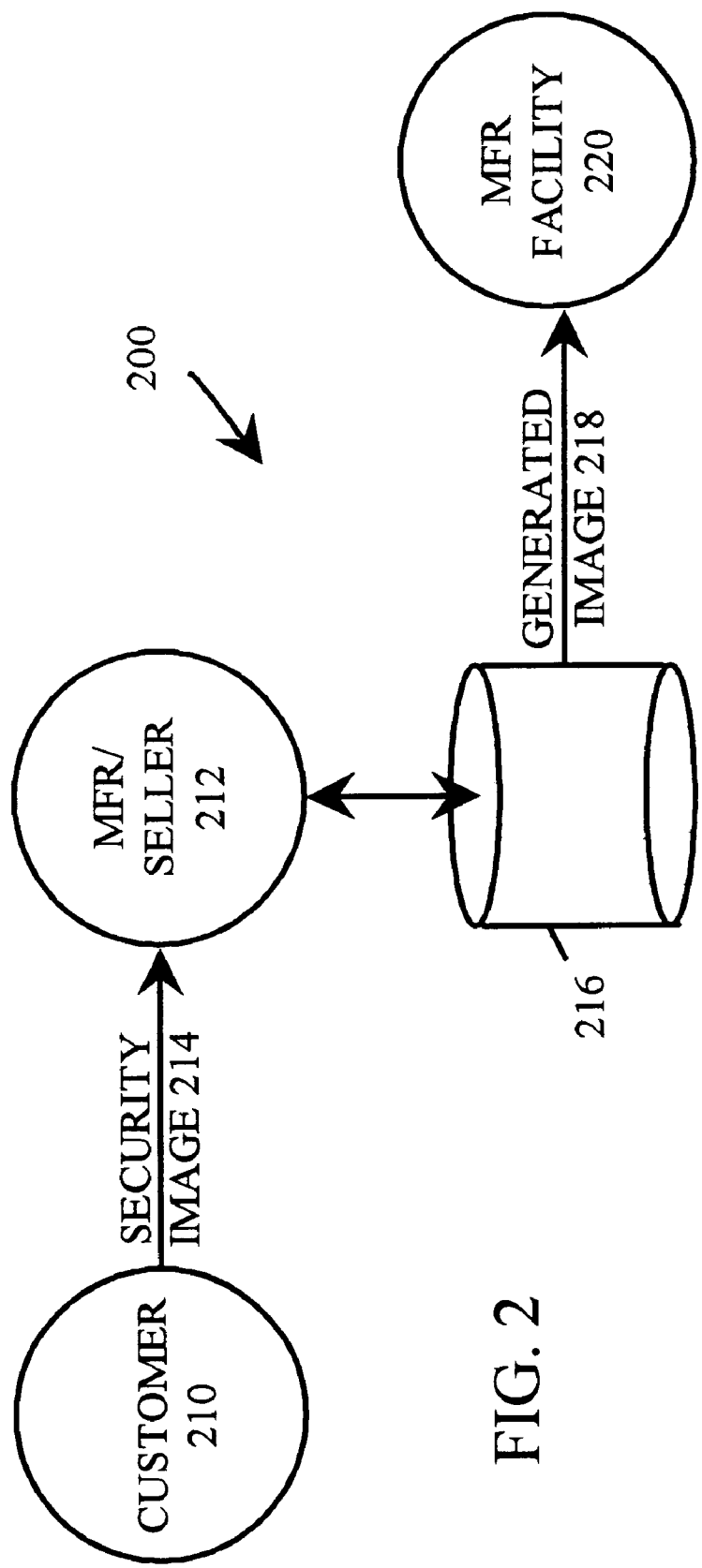
FIG. 2 is a flow diagram showing a process flow used for configuring security attribute information under Security Management Tool (SMT) control.

Referring to FIG. 2, a flow diagram shows a process flow used for configuring security attribute information under Security Management Tool (SMT) control. The SMT 100 operates automatically to specially configure the security management operations of a particular computer system according to the hardware and software configuration of the system, and according to the requests and desires of the user. The flow diagram depicts an automated security configuration procedure 200 that selectively sets static security attributes of the computer system. The security attributes are divided into several attribute classifications including users, groups, access control list (ACL), files, and registry keys.

The process flow of the security configuration procedure 200 begins when a customer 210 generates an order and submits the order to the manufacturer/seller 212. During the ordering procedure, the customer 210 creates an order specification including specification of hardware, software, peripherals, and configuration information. The order specification includes a security image 214 that the customer 210 generates in combination with the manufacturer/seller 212. Content of the security image 214 is based upon the particular hardware, software, peripherals, and configuration information specified by the customer, in addition to any particular security features that are affirmatively requested by the customer 210.

The customer generates an order specification using one of a variety of ordering techniques including ordering at a retail or wholesale distributor, or other type of system supplier. Other ordering techniques include ordering by telephone, mail, or electronic mail. Other orders are produced and submitted by communication techniques such as ordering by internet or other network communication.

The manufacturer/seller 212 then accesses a configuration image database 216 which includes the central security configuration database 110 and assembles an image including user information, group information, file system information, and registry information, for example. The configuration image database 216 supports a plurality of operating environments, such as Windows NT™, Microsoft Office™, and other environments. The configuration image database 216 further includes various executable files including the Security Management Tool (SMT) file and including selected database files such as relational database files. A particular generated image 218 is produced from the configuration image database 216 and is selected based on the security image 214 generated by the customer 210 in conjunction with the manufacturer/seller 212.

The generated image 218 is transferred from the configuration image database 216 and supplied to a manufacturing facility 220 that integrates the hardware, software, and peripherals selected by the customer 210 to form a computer system having the selected configuration. Various manufacturing facilities may include differing aspects of manufacture. For example, various manufacturing facilities may perform differing amounts of hardware assembly, some completely assembling all components, others simply supplying a completely functional hardware system. Various manufacturing facilities install the generated image 218 using differing techniques such as loading from media such as diskette or CD ROM, and direct download via communication port.

One particular technique for generating the image is by system cloning, a sector-by-sector brute force copying of a master system hard drive. One problem with system cloning is that system security identifiers (SIDs) are copied along with the images, causing a breach in security. A utility program is supplied to modify the SIDs within the image so that the SIDs correspond to an appropriate security identifier. A further problem is that Microsoft Windows does not support system cloning.

A second technique for generating a security image includes creating desired executable images including control structures such as Access Control Lists (ACLs), then modifying the ACLs using an ACL editor utility.

A third technique for generating a security image uses a scripting language, for example, WinBatch, Pearl, REXX, and the like, to access and edit security attributes. The scripting languages typically use Win32 Application Program Interfaces (APIs) including C++ language modification of pointers to tailor security characteristics.

A fourth technique for generating a security image uses a Windows NT™ security editor to modify security attributes.

Referring to FIG. 3, a schematic block diagram illustrates modes of operation of a Security Management Tool (SMT) 100 that is used to configure security attributes in a computer system. The illustrative Security Management Tool (SMT) 100 is a stand-alone utility that solves the problem of efficiently and accurately configuring security attributes for multiple computer systems. The SMT 100 includes a graphical user interface that interactively and selectively operates in one of at least two functional modes. Two of the operating modes are a Capture Mode 310 and a Set Mode 312. Typically, an operator selects the mode of operation using an interface such as the graphical user interface (GUI) although other types of interfaces may otherwise be employed. Typical security information groupings for files in the security information database 330 include User/Group security information, file system security information, registry system security information groupings, and the like. SMT 100 stores security information in a security attribute file in the security information database 330 that serves as a central security configuration database.

In the Capture Mode 310, the SMT 100 captures previously specified security information and stores the information in a file in a security information database 330. Upon interactive request by the operator, the SMT 100 executes an automated operation that is controlled by operator instructions that invokes the Capture Mode 310. In the Capture Mode 310, the SMT 100 captures a definition of the security attributes on a particular, selected computer system. An exemplary Security Management Tool system operates to capture some or all of the security information from a previously-configured computer system that operates under the Windows NT™ operating system and to store the security information in a file in the security information database 330. In a subsequent operation, the operator invokes the Set Mode 312 which accesses an operator-specified file in the security information database 330 and sets the captured security attribute definition on one or more subsequently-configured systems. In the illustrative example, the SMT 100 replicates the captured Windows NT security information on another, subsequently-configured computer system.

The SMT 100 captures and configures, and thus duplicates, security attribute information according to selected security information groupings. In an illustrative system, the Capture Mode 310 begins with a Get User/Group Information 320 operation. The Get User/Group Information 320 operation captures a user name, a user comment, and associated user flags and stores the user and group information in a file in the security information database 330 for configuration of a subsequently-configured system. The Get User/Group Information 320 operation also captures any user rights and user profiles associated with the users for later configuration of user rights and profiles on the subsequently-configured system. The Get User/Group Information 320 operation also captures a group name, group comment, and identification of associated group members, as well as any rights granted to the particular group for later configuration of groups and group rights.

The Capture Mode 310 includes a Get File System Information 322 operation. The SMT 100 captures Access Control Lists (ACLs) associated with each file and directory on the system. The ACLs are stored in a file within the security information database 330 and used for configuration of other systems.

The exemplary Capture Mode 310 further includes a Get Registry System Information 324 operation. The SMT 100 captures Access Control Lists (ACLs) associated with each registry key on the system. The Get Registry System Information 324 operation also captures ownership settings for files and registry keys. The registry key ACLs and ownership setting are stored in the security information database 330.

In the Set Mode 312, the SMT 100 uses information from a specified security information file that is interactively selected from among security information files created by the Capture Mode 310 operation. A Set User/Group Information 332 operation accesses user and group information from the specified file in the security information database 330 and sets the configuration of a newly-configured system. In one embodiment, the SMT 100 supports user/group support for Windows NT™ regardless of the file system that is currently installed on the system. In one embodiment, SMT 100 supports files on Windows NT™ systems that use an NTFS (Windows NT ™ File System).

In a Set File System Information 334 operation, the SMT 100 accesses file and directory ACLs from the specified file in the security information database 330 and transfers the ACLs for usage in a newly-configured system. Similarly, in a Set Registry System Information 336 operation, the security information database 330 is accessed to read registry key ACLs and ownership settings to set registry and ownership in the newly-configured system.

Figure 4:
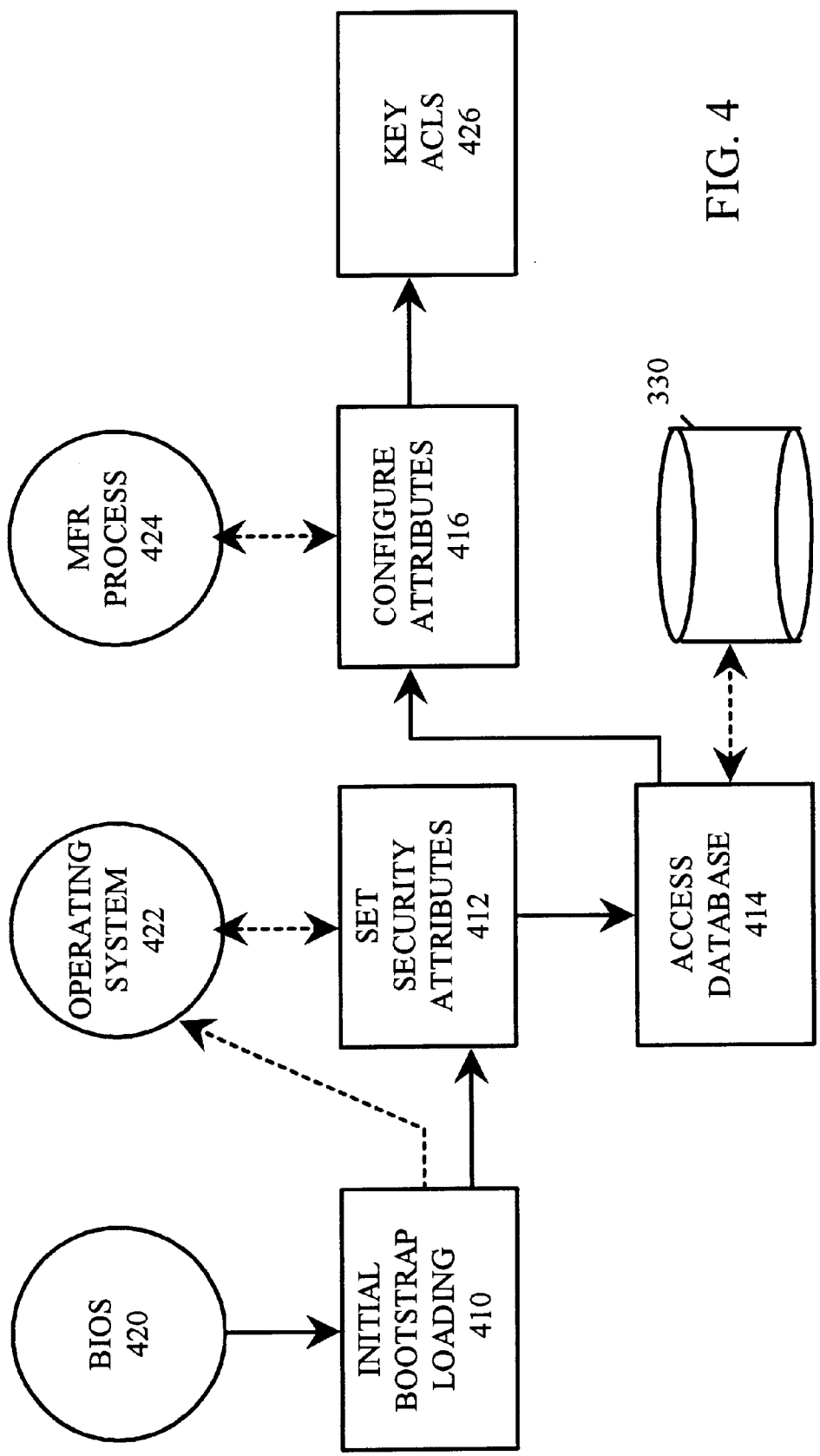
FIG. 4 is a schematic flow diagram illustrating operation of a configuration routine of a Set Mode operation.

Referring to FIG. 4, a schematic flow diagram illustrates the operation of a configuration routine that functions according to the Set Mode 312 operation described with respect to FIG. 3. The Security Management Tool (SMT) 100 is invoked at the initial bootstrap loading 410 of a computer system that is not yet configured, such as newly constructed computer system or a used system that has been initialized. Initial bootstrap loading 410 is typically invoked through a special initialization programming such as Basic Input/Output System (BIOS) programming 420, generally without operator interaction or intervention. Initial bootstrap loading 410 in the target BIOS 420 activates a, Set Security Attributes 412 functionally that is operational under control of an operating system 422 and accesses the security information database 330 in an Access Database 414 operation. The Access Database 414 operation functions as a manufacturer's process 424. The Access Database 414 operation is typically encrypted to ensure security.

The accessed information is then loaded to security attribute structures in the system under configuration in a Configure Attributes 416 operation that includes interaction of the operating system 422 and the manufacturer's process 424. The Configure Attributes 416 operation includes keying of Access Control Lists 426 using string identifiers.

Figure 5:
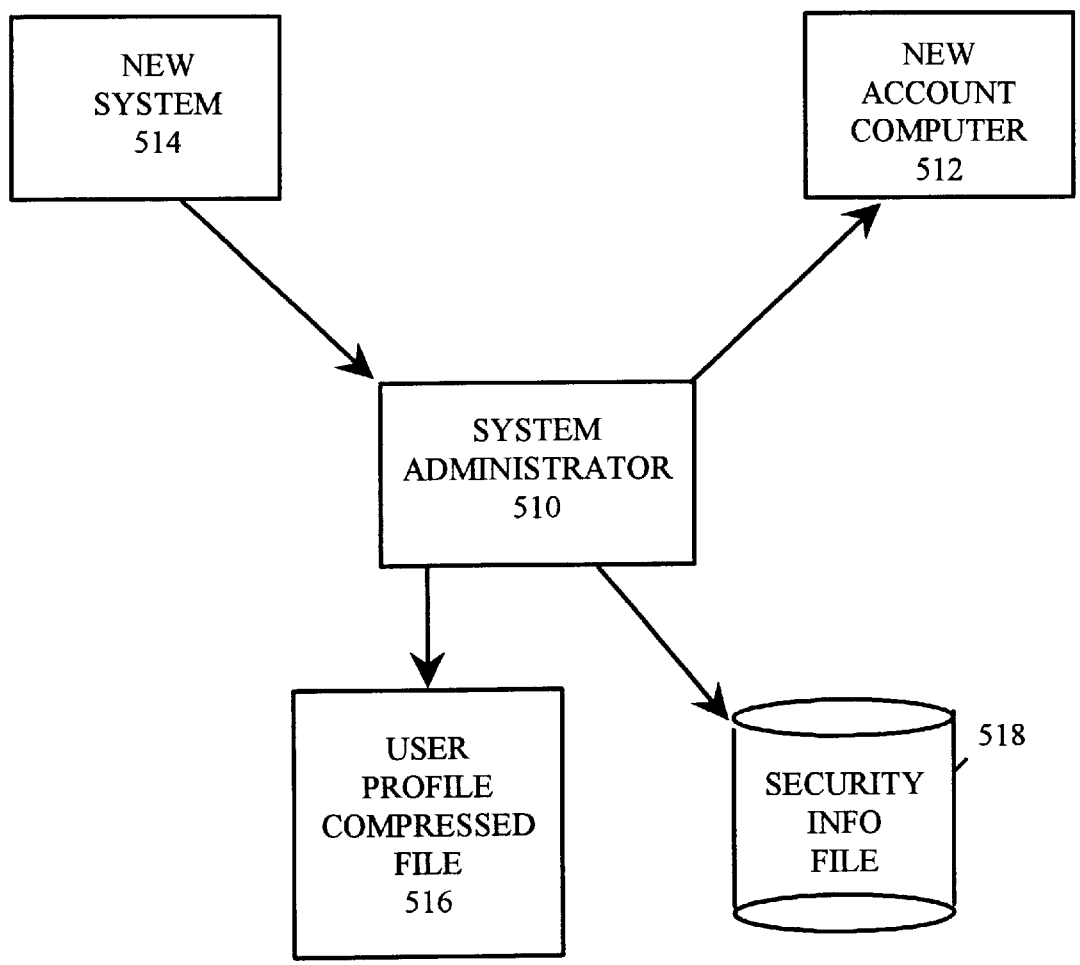
FIG. 5 is a schematic block diagram that depicts a network system that is suitable for implementing the Security Management Tool.

Referring to FIG. 5, a schematic block diagram depicts a network system under which the Security Management System 100 is optionally implemented. A system administrator 510 controls operation of the SMT 100 within a network 500. The system administrator 510 is activated by an operator who interactively directs operations from a new account computer 512. An operator having an administrative priority logs onto the network system and the SMT 100 for configuration of a new system 514 using a Set Mode 312 operation, as described with respect to FIG. 3. Prior to configuration, an operator has captured security attributes and stored attributes on the security information database 330. The security information database 330 includes a compressed User Profile file 516. The operator interacts with the system administrator 510 to select desired security attributes for the new account computer 512 and creates a security information file 518 that holds the selected security attributes. After the security information file 518 is formed, the operator configures the new account computer 512 from the security information file 518.

Referring to FIG. 6, a block diagram shows computer system 600 that is suitably configured using the Security Management Tool (SMT) 600. The computer system 600, typically a personal computer, includes a processor 610, a system random access memory (RAM) 620, a system ROM 622, a CD-ROM drive 632, and various other input/output devices 640. The computer system 600 is shown to include a hard disk drive 630 connected to the processor 610 although some embodiments do not include the hard disk drive 630. In particular, an illustrative method for building a bootable operating system compact disk (CD) for use with a computer system with or without a hard disk drive installed and formatted is useful when the computer system 600 either does not include a hard disk drive 630 or the hard disk drive 630 does not have an operating system, for example the Windows™ operating system, installed on the hard disk drive 630.

The processor 610 communicates with the system components via a bus 650 which includes data, address and control lines. A CMOS clock nonvolatile RAM 660, which is connected to the processor 610 via the bus 650, is typically utilized to store information even when power to the computer system 600 is interrupted. Program instructions that make up the system for creating an operating system independent environment are stored in a storage device such as the hard disk drive 630 or the system ROM 622 connected to the processor 610. The processor 610, for example an x86 processor such as a 486, 586 or Pentium™ processor, executes the computing operations of the computer system 600.

While the disclosure has been described with reference to various embodiments, it will be understood that these embodiments are illustrative and that the scope of the disclosure is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the disclosure. Variations and modifications of the embodiments disclosed herein may be made based on the description set forth herein, without departing from the scope and spirit of the disclosure as set forth in the following claims.

In the claims, unless otherwise indicated the article "a" is to refer to "one or more than one".

What is claimed is:

1. A method of capturing security attributes for a computer system comprising;

providing a security management tool (SMT) that executes an automated operation for capturing a definition of security attributes on a previously-configured computer system, the SMT cloning the security attributes according to selected security information groupings;

providing an unconfigured computer;

retrieving the security definition;

storing the security definition and an operating system on a bootable medium coupled to the unconfigured computer; and configuring the security of the operating system upon an initial bootstrap loading of the operating system using the security definition, the configuring including keying an access control list using string identifiers.

2. A method according to claim 1 further comprising:

acquiring a plurality of security attributes from the previously-configured computer system including a user name, a user comment, and a plurality or user flags.

3. A method according to claim 1 further comprising:

acquiring a plurality of security attributes from the previously-configured computer system including a user name and user rights associated with the user name.

4. A method according to claim 1 further comprising:

acquiring a plurality of security attributes from the previously-configured computer system including a plurality of user names and a plurality of user rights associated with corresponding ones of the plurality of user names.

5. A method according to claim 1 further comprising:

acquiring a plurality of security attributes from the previously-configured computer system including a group name, a group comment, and associated group members.

6. A method according to claim 1 further comprising:
acquiring a plurality of security attributes from the previously-configured computer system including an access control list associated with a file or directory on the computer system.

7. A method according to claim 1 further comprising:
acquiring a plurality of security attributes from the previously-configured computer system including an access control list associated with a registry key on the computer system.

8. A method according to claim 1 further comprising:
acquiring a plurality of security attributes from the previously-configured computer system including an ownership status associated with a file and a registry key on the computer system.

9. A method according to claim 8 wherein:
the file includes a plurality of relationship database tables.

10. A method according to claim 1 wherein:
the operating system defines a plurality of registry keys and the security attributes include a plurality of Access Control Lists respectively associated with the plurality of registry keys.

11. A method according to claim 1 wherein:
the computer system includes a plurality of files and a plurality of directories stored on a storage device and the security attributes include a plurality of Access Control Lists associated with the pluralities of files and directories.

12. A method according to claim 1 further comprising:
providing a second computer system in addition to the first previously-configured computer system, the operating system being resident on the first previously-configured computer system; and
a network communicatively coupling the first previously-configured computer system and the second computer system, wherein the second computer system acquires the security attribute from the first previously-configured computer system.

13. A method according to claim 12 further comprising:
storing a plurality of user profiles on a storage medium coupled to the second computer system wherein a file Is selected from the plurality of user profiles.

14. A method of configuring security attributes in a computer system comprising:
providing a security management tool (SMT) that executes an automated operation foe capturing a definition of security attributes on a previously-configured computer system, the SMT cloning the security attributes according to selected security information groupings;
storing the predefined security definition into a file in a storage medium;
providing a subsequent computer;
reading the file from the storage medium;
storing the security definition and an operating system on a bootable medium coupled to tile unconfigured computer; and
configuring the security of the operating system upon an initial bootstrap loading of the operating system using the security definition, the configuring including keying an access control list using string identifiers.

15. A method according to claim 14 further comprising:
setting a plurality or security settings in the computer system including security settings corresponding to attributes of a user name, a user comment, a plurality of user flags, and user rights associated with the user name.

16. A method according to claim 14 further comprising:
setting a plurality of security settings In the computer system including a group name, a group comment, and associated group members.

17. A method according to claim 14 further comprising:
setting a plurality of security settings in the computer system including an access control list associated with a file or directory on the computer system.

18. A method according to claim 14 further comprising:
setting a plurality of security settings in the computer system including an access control list associated with a registry key on the computer system.

19. A method according to claim 14 further comprising:
setting a plurality of security settings in the computer system including an ownership status associated with a file and a registry key on the computer system.

20. A method according to claim 14 wherein:
setting a plurality of security settings in the computer system including an access control list associated with a registry key on the computer system.

21. A method according to claim 14 wherein:
the computer system includes a plurality of files and a plurality of directories stored on a storage device and the security attributes include a plurality of Access Control Lists associated with each of the pluralities of files and directories.

22. A method of configuring security attributes in a computer system comprising:
providing a security management tool (SMT) that executes an automated operation for capturing a definition of security attributes on a previously-configured computer system, the SMT cloning the security attributes according to selected security information groupings;
storing the security definition in a file in a network accessible storage system;
reading a file in the storage system , the file storing a plurality of security attributes acquired from the previously-configured computer system; and
setting a security setting of an unconfigured computer system during an initial configuration of the unconfigured computer, the security setting corresponding to a security attribute read from the file, the configuration including keying an access control list using string identifiers.

23. A security management facility for configuring security attributes in an unconfigured computer system comprising:
means for providing a security management tool (SMT) that executes an automated operation for capturing a definition of security attributes on a previously-configured computer system, the SMT cloning the security attributes according to selected security information groupings;
means for storing the security definition in a central security definition database;
means for retrieving the security definition;
means for storing the security definition and an operating system on a bootable medium coupled to the unconfigured computer; and
means for configuring the security of the operating system upon an initial bootstrap loading of the operating system of an unconfigured computer, wherein the means for configuring uses the security definition, and the configuring includes keying an access control list using string identifiers.

24. An information handling system comprising:

a processor;

a media drive coupled to the processor; and a security management tool (SMT) that executes an automated operation for capturing a definition of security attributes on a previously-configured computer system, the SMT cloning the security attributes according to selected security information groupings;

a computer usable medium accessible on the media drive and having computable readable code embodied therein implementing a software program executable on the processor for configuring the security attributes in a computer system including:

a routine that acquired the security definition from the previously-configured computer system operating under control of an operating system, the security definition including security attributes;

a routine that stores the security definition in a file in a network accessible database;

a routine that reads a file in the network accessible database, the file containing a security definition acquired from the previously-configured computer system; and a routine that initially configures the operating system and sets a security setting of an unconfigured computer system, the security setting corresponding to the security definition and the configuring includes keying an access control list using string identifiers.

* * * * *